United States Patent [19]

Raynolds et al.

[11] Patent Number: 6,005,035
[45] Date of Patent: Dec. 21, 1999

[54] STABLE WATERBORNE POLYMER COMPOSITIONS CONTAINING POLY (ALKYLENIMINES)

[75] Inventors: Peter Webb Raynolds; Duane Allan Scott, both of Kingsport, Tenn.

[73] Assignee: Eastman Chemical Company, Kingsport, Tenn.

[21] Appl. No.: 09/022,802

[22] Filed: Feb. 13, 1998

[51] Int. Cl.$^6$ ...................................................... C08K 3/20
[52] U.S. Cl. ............................................................ 524/253
[58] Field of Search ...................................... 524/718, 253

[56] References Cited

U.S. PATENT DOCUMENTS

| | | | |
|---|---|---|---|
| 4,032,482 | 6/1977 | Moriya | 260/2.2 |
| 4,634,544 | 1/1987 | Weber | 252/95 |
| 4,678,606 | 7/1987 | Akhter | 252/542 |
| 5,002,680 | 3/1991 | Schmidt | 252/90 |
| 5,264,467 | 11/1993 | DiStefano | 523/218 |
| 5,296,159 | 3/1994 | Wilson | 252/117 |
| 5,296,530 | 3/1994 | Bors et al. . | |
| 5,484,975 | 1/1996 | Itatsu . | |
| 5,498,659 | 3/1996 | Esser . | |
| 5,525,662 | 6/1996 | Lavole et al. . | |
| 5,674,511 | 10/1997 | Kacher | 424/401 |

FOREIGN PATENT DOCUMENTS

| | | |
|---|---|---|
| 0 271 033 | 6/1988 | European Pat. Off. . |
| 6-121171 | 4/1994 | Japan . |
| WO 97 45468 | 12/1997 | WIPO . |

OTHER PUBLICATIONS

Kirk–Othmer: "Encyclopedia of Chemical Technology," Wiley–Interscience, New York US XP002091794, 3$^{rd}$ ed. vol. 8 pp. 900–915, "emulsions" see table 4.

*Primary Examiner*—Paul R. Michl
*Attorney, Agent, or Firm*—Rose M. Allen; Harry J. Gwinnell

[57] ABSTRACT

This invention provides waterborne polymer compositions stabilized against gelling due to the addition of a poly (alkylenimine) by addition of nonionic surfactants having a hydrophilic-lipophilic balance (HLB) of at least about 17.5. The waterborne polymer compositions of the invention are useful in a variety of coating formulations such as, for example, paints, inks, sealants, textile backcoatings, adhesives and the like. Methods of making stable waterborne polymer compositions are also disclosed.

20 Claims, No Drawings

STABLE WATERBORNE POLYMER COMPOSITIONS CONTAINING POLY (ALKYLENIMINES)

FIELD OF THE INVENTION

This invention belongs to the field of emulsion chemistry. In particular, it relates to stable waterborne polymer compositions useful in a variety of coating formulations.

BACKGROUND OF THE INVENTION

In an increasing number of industries, aqueous coating compositions continue to replace traditional organic solvent-based coating compositions. Paints, inks, sealants, and adhesives, for example, previously formulated with organic solvents are now formulated as aqueous compositions. This reduces potentially harmful exposure to volatile organic compounds (VOC's) commonly found in solvent-based compositions. While the move from organic solvent-based to aqueous compositions brings health and safety benefits, the aqueous coating compositions must meet or exceed the performance standards expected from solvent-based compositions. The need to meet or exceed such performance standards places a premium on the characteristics and properties of waterborne polymer compositions used in aqueous coating compositions.

Waterborne polymer having various functional groups have been used to impart and achieve desired properties to a particular coating composition. For example, a coating composition should exhibit good film formation, print and block resistance, as well as adhesion and tensile properties. Polymers having acetoacetoxy- and enamine-functional groups represent one example of waterborne polymers which have such properties, may carry different functional groups, and are useful in aqueous coating compositions.

U.S. Pat. No. 5,296,530 discloses a quick-curing coating prepared from a polymer having acetoacetyl groups, in which substantially all of the acetoacetyl groups have been converted to enamine functional groups. This conversion occurs, for example, by treatment with ammonia or a primary amine. Coatings so prepared cure more quickly under sunlight or ultraviolet light than coatings which contain the acetoacetyl functional polymer but which have not been converted to an enamine form.

U.S. Pat. Nos. 5,484,975 and 5,525,662 describe the preparation of polymers containing functional acetoacetate groups and then, following the polymerization, reacting the acetoacetate group with a functional amine to form an enamine. The resulting polymers are reported to have a variety of uses including coatings, sealants, adhesives, and saturant applications.

U.S. Pat. No. 5,498,659 discloses polymeric formulations comprising an aqueous carrier, at least one polymeric ingredient, a non-polymeric polyfunctional amine, and a base. The polymeric ingredient has both acid-functional and acetoacetoxy-type functional moieties. The aqueous polymeric formulations produce crosslinked polymeric surface coatings on a substrate.

Japanese Patent 61-21171 describes a fast-curing adhesive of two separate liquids. The first liquid is an aqueous solution and/or aqueous emulsion of a polymer compound containing an acetoacetyl group. The second liquid consists of polyethylenimine.

Even with current waterborne polymer formulations, a need remains for improved aqueous coating compositions and waterborne polymers for use in those compositions. In particular, a need exists for waterborne polymer compositions which may formulate as a single, stable composition but which undergo crosslinking upon film formation imparting one or more desired properties to the resulting coating. The present invention meets such needs.

SUMMARY OF THE INVENTION

This invention provides stable waterborne polymer compositions which are stabilized against gelling, upon addition of a poly(alkylenimine), preferably by post polymerization addition of a surfactant. Preferred surfactants are nonionic surfactants having a hydrophilic-lipophilic balance (HLB) of at least about 17.5. These stable waterborne polymer compositions are useful in a variety of coating formulations such as, for example, paints, inks, sealants, and adhesives. When used in coating formulations, the stable waterborne polymer compositions of the invention provide adhesion and crosslinking in the final film or coating. The film or coating may be cured at ambient temperatures or may be thermally cured. Methods of preparing stable waterborne polymer compositions are also disclosed, along with methods of stabilizing latex compositions against gelling upon addition of a poly(alkylenimine).

DETAILED DESCRIPTION OF THE INVENTION

The present invention provides stable waterborne polymer compositions, that is compositions containing a polymer and water. Waterborne polymer compositions include, but are not limited to, latexes, dispersions, microemulsions, or suspensions. Waterborne polymer compositions of the present invention are stable and may be stored at room temperature or moderately above room temperature (e.g., about 50 to 60° C.) and provide adhesion and crosslinking upon film formation when applied to a substrate. Yet, a film or coating formed with polymers of the invention may be cured at room temperature (ambient cure) or at elevated temperatures (thermal cure).

The polymers used to prepare the waterborne polymer composition of the present invention are generally prepared as particles. The particles may be structured or unstructured. Structured particles include, but are not limited to, core/shell particles and gradient particles. The average polymer particle size may range from about 25 to about 600 nm.

The polymer particles generally have a spherical shape. In one embodiment, the generally spherical polymeric particle may have a core portion and a shell portion. The core/shell polymer particles may also be prepared in a multilobe form, a peanut shell, an acorn form, or a raspberry form. It is further preferred in such particles that the core portion comprises about 20 to about 80 of the total weight of said particle and the shell portion comprises about 80 to about 20 of the total weight volume of the particle.

Although the following description will be directed to a discussion of specific types of polymers, it may be seen from the examples that other waterborne latex polymers that are susceptible to gelling upon addition of a poly(alkylenimine) are within the scope of the present invention.

Enamine-functional polymers represent a preferred embodiment of polymers used to form the stable waterborne polymer compositions of the present invention. Enamine-functional polymers may be prepared by reacting a polymer having acetoacetoxy groups with ammonia or a primary or secondary amine. The primary or secondary amine may be a monoamine compound or a polyamine compound. Preferred amines include, for example, triaminononane, $H_2N$ (CH$_2$)$_3$CH(CH$_2$NH$_2$)(CH$_2$)$_4$NH$_2$ (CAS Registry No. 1572-55-0), available from Monsanto; 2-amino-2-methyl-1-propanol available as AMP-95 product from Angus Chemical Company, Buffalo Grove, Ill.; or, as described below, polyethylenimine, (PEI). In water-based latexes, the enamine functionality serves to further stabilize the acetoacetoxy-groups and protect them from hydrolysis. Enamine-functional polymers have been described in Moszner et al., Polymer Bulletin 32, 419–426 (1994); European patent Application No. 0 492 847 A2; U.S. Pat. No. 5,296,530; and U.S. Pat. No. 5,484,849. These documents are incorporated herein by reference.

Acetoacetoxy-type functional polymers useable in the present invention may be prepared by free radical emulsion polymerization of vinyl monomers having an acetoacetoxy functionality such as those of Formula (I) below with other vinyl monomers. This combination of monomers provides water-based dispersion of polymer particles where the polymer has pendant acetoacetoxy groups. As used here, a "vinyl" monomer is an ethylenically unsaturated monomer. A pendant acetoacetoxy group is not strictly limited to those at the termini of the polymer. Pendant acetoacetoxy groups also include groups attached to the polymer's backbone and available for further reaction.

Acetoacetoxy-type functional polymers preferably contain about 0.5 to about 30 weight percent of vinyl monomers having acetoacetoxy-type functionality such as those of Formula I, and about 99.5 to about 70 weight percent of other vinyl monomers, preferably alkyl (meth)acrylates having 1 to 18 carbons. The weight percentage is based on the total amount of monomers in the composition. More preferably, the stabilized polymer has about 1 to about 15 weight percent acetoacetoxy monomers, and about 99 to about 85 weight percent of other vinyl monomers.

Aspects of this emulsion polymerization and preferred embodiments are discussed below beginning with vinyl monomers as in Formula (I) which have an acetoacetoxy-type functionality.

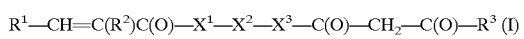

R$^1$—CH=C(R$^2$)C(O)—X$^1$—X$^2$—X$^3$—C(O)—CH$_2$—C(O)—R$^3$ (I)

For an acetoacetoxy-type monomer of Formula (1), R$^1$ is a hydrogen or halogen. R$^2$ is a hydrogen, halogen, C$_1$–C$_6$ alkylthio group, or C$_1$–C$_6$ alkyl group. R$^3$ is a C$_1$–C$_6$ alkyl group. X$^1$ and X$^3$ are independently O, S, or a group of the formula —N(R')—, where R' is a C$_1$–C$_6$ alkyl group. X$^2$ is a C$_2$–C$_{12}$ alkylene group or C$_3$–C$_{12}$ cycloalkylene group. The alkyl and alkylene groups described here and throughout the specification may be straight or branched groups. Preferred monomers of Formula (I) are acetoacetoxyethyl methacrylate, acetoacetoxyethyl acrylate, acetoacetoxy (methyl)ethyl acrylate, acetoacetoxypropyl acrylate, allyl acetoacetate, acetoacetamidoethyl (meth)acrylate, and acetoacetoxybutyl acrylate. Acetoacetoxyethyl methacrylate (AAEM) represents a particularly preferred monomer of Formula (I).

Suitable other vinyl monomers which may be reacted with the vinyl monomers having acetoacetoxy-type functionality include, but are not limited to, methyl acrylate; methyl methacrylate; ethyl acrylate; ethyl methacrylate; butyl acrylate; butyl methacrylate; isobutyl acrylate; isobutyl methacrylate; ethylhexyl acrylate; ethylhexyl methacrylate; octyl acrylate; octyl methacrylate; styrene; -m ethyl styrene; glycidyl methacrylate; carbodiimide methacrylate; C$_1$–C$_{18}$ alkyl crotonates; di-n-butyl maleate; dioctylmaleate; allyl methacrylate; di-allyl maleate; di-allylmalonate; methoxybutenyl methacrylate; isobornyl methacrylate; hydroxybutenyl methacrylate; hydroxyethyl (meth)acrylate; hydroxypropyl (meth)acrylate; acrylonitrile, vinyl chloride; ethylene; methacrylamide; acrylamide; butyl acrylamide; ethyl acrylamide; vinyl (meth)acrylate; isopropenyl (meth)acrylate; cycloaliphatic epoxy (meth)acrylates; and ethylformamide. Such monomers are described in "The Brandon Worldwide Monomer Reference Guide and Sourcebook" Second Edition, 1992, Brandon Associates, Merrimack, N.H.; and in "Polymers and Monomers", the 1996–1997 Catalog from Polyscience, Inc., Warrington, Pa.

Vinyl esters of the general Formula (II) represent further examples of useful other vinyl monomers:

RCH=CH—O—C(O)—C(R)$_3$ (II)

In Formula (II), R is independently hydrogen or an alkyl group of up to 12 carbon atoms. Particular monomers of Formula (II) include CH$_2$=CH—O—C(O)—CH$_3$, CH$_2$=CH—O—C(O)—C(CH$_3$)$_3$, CH$_2$=CH—O—C(O)—CH(C$_2$H$_5$)(C$_4$H$_9$), and CH$_2$=CH—O—C(O)—CH$_2$CH$_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Oreg. Coatings 22, 19 (1993).

Optional monomers that may be incorporated into the polymer include styrene, butyl styrene, vinyl toluene, $\alpha$-methyl styrene, (meth)acrylamide, (meth)acrylonitirle, vinyl acetate, and vinyl esters of acids other than acetic acid, itaconic anhydride, maleic anhydride, vinyl formate, and salts of 2-sulfoethyl (meth)acrylate.

In one embodiment, the acetoacetoxy functional polymer may also incorporate nitrogen-containing, vinyl monomers known to promote wet adhesion. Exemplary wet adhesion monomers include, for example, t-butylaminoethyl methacrylate; dimethylaminoethyl methacrylate; diethylaminoethyl methacrylate; N,N-dimethylaminopropyl methacrylamide; 2-t-butylaminoethyl methacrylate; N,N-dimethylaminoethyl acrylate; N-(2-methacrylamido-ethyl) ethylene urea; and N-(2-methacryloyloxyethyl)ethylene urea. N-(2-methacryloyloxyethyl)ethylene urea is available from RohmTech as 50% solution in water under the Rohamere 6852-O trade name and as a 25% solution in water under the Rohamere 6844 trade name. N-(2-methacrylamido-ethyl)ethylene urea is available from Rhone-Poulenc under the WAM trade name.

Small amounts of acid vinyl monomers may also be used to prepare acetoacetoxy emulsion polymers according to the invention. Such acid vinyl monomers include, for example, acrylic acid, methacrylic acid, crotonic acid, itaconic acid, maleic acid, fumaric acid, and 2-acrylamido-2-methyl-1-propanesulfonic acid (sodium, potassium, or ammonium salts). Incorporating acid vinyl monomers into the stabilized polymer may increase the viscosity of the resulting latex and may have a detrimental effect on the formation of an enamine-functional polymer according to the invention. Generally these monomers are used in small amounts. Preferably, the amount of acid vinyl monomers may range, for example, from 0 to 5 phr. Larger amounts of acid vinyl monomers may be used to achieve a desired effect, such as increased viscosity.

The acetoacetoxy polymer may be prepared using emulsion polymerization techniques known in the art. The acetoacetoxy polymer may, as is known in the art, be prepared using free radical emulsion polymerization techniques which yield structured or unstructured particles. As mentioned above, structured particles include, for example, core/shell particles, raspberry particles, and gradient particles. Chain transfer agents, initiators, reducing agents, catalysts, and surfactants known in the art of emulsion polymerization, may be used to prepare the polymers.

Chain transfer agents may optionally be added, in an amount up to about 2 weight percent based on total monomer content, to control the molecular weight of the polymer. Use of chain transfer agents may be preferred when it is desired to obtain low molecular weight polymers. Exemplary chain transfer agents are butyl mercaptan, mercaptopropionic acid, 2-ethylhexyl mercaptopropionate, dodecylmercaptan, n-butyl mercaptopropionate, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, and the reactive chain transfer agents taught in U.S. Pat. No. 5,247,040, incorporated here by reference. In particular, 2-ethylhexyl mercaptopropionate and dodecylmercaptan represents preferred chain transfer agents.

Typical initiators include hydrogen peroxide, sodium, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Polymerization catalysts are those compounds which increase the rate of polymerization and which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof. Peroxide-iron and peroxide-sulfite redox catalysts may also be used.

Crosslinking agents may optionally be added, in an amount up to about 2 weight percent, based on total monomer content, to control the molecular weight of the polymer. Use of crosslinking agents may be preferred when it is desired to obtain high molecular weight polymers. Useful crosslinkers include trimethylolpropane tri(meth)acrylate, 1,6-hexanediol di(meth)acrylate, allyl methacrylate and the like.

Any conventional polymerization surfactant may be used to form the polymers of the present invention. Useful surfactants include, but are not limited to, ionic and nonionic surfactants such as alkyl polyglycol ethers; alkyl phenol polyglycol ethers; alkali metal ammonium salts of alkyl, aryl or alkylaryl sulfonates, sulfates, phosphates, and the like, and reactive anionic or nonionic surfactants possessing styrene or allyl groups. Sulfonate containing surfactants such as sodium dodecyl benzene sulfonate, sodium dodecyl sulfate, or the diesters of sodiosulfosuccinic acid such as sodium dioctylsulfo-succinate, and alpha olefin sulfonates are suitable. When persulfate catalysts are used, in-situ-generated oligomers with sulfate end groups may act as surfactants.

Although the above list of useful surfactants may include some of the same surfactants listed below for post polymerization addition, incorporation of these particular surfactants into the polymerization process is a less preferred method of stabilizing the polymer against gelling upon addition of poly(alkyleneimine) and upon adjustment of pH of the polymer. Although they may be used in the emulsion polymerization process, they may contribute to processing problems such as increased particle size and increased amounts of coagulum in the polymer.

The type and amount of surfactant used in the polymerization process depends on the specific composition, reaction conditions, and the desired final particle size, as is known in the art.

Water-dispersible and water-soluble polymers may also be employed as surfactants/stabilizers in the water-based latexes of the invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; alkali-soluble acrylic resins as described in U.S. Pat. No. 4,839,413; and hydroxyethyl cellulose, as described in U.S. Pat. No. 3,876,596 and British Patent 1,155,275.

The acetoacetoxy functionality in the polymer may be present as free acetoacetoxy groups or as derivatives of those groups such as, for example, an enamine group or acetoacetamide group. The acetoacetoxy-functional polymer may contain both free acetoacetoxy groups and acetoacetoxy derivatives.

As discussed above, enamine-functional polymers may be prepared by addition of a primary or secondary amine to the acetoacetoxy polymer. Preferred amines are poly (alkyleneimines). Poly(alkylenimines) for use in the invention may have a weight average molecular weight of about 800 to about 750,000. The poly(alkylenimine) is preferably a poly(ethylenimine) (PEI) and more preferably PEI having a weight average molecular weight of about 800 to about 25,000. The PEI may contain primary, secondary, and tertiary amine groups, for example, in a ratio of 1.5:1.4:1.0, respectively. Such PEI compounds are commercially available from BASF Corporation as LUPASOL™ G-35 poly (ethylenimine). Depending on the requirements of the end-use of the formulation, the content of polyethylenimine can vary from 0.5 to 25 weight percent based on the dry weight of the acetoacetoxy polymer. More preferably, the content of polyethylenimine can vary from 2 to 12 weight percent based on the dry weight of the acetoacetoxy polymer.

However, poly(alkylenimines), particularly poly (ethylenimine), are known to flocculate latexes, and are actually sold for that purpose. The pH of the prepared latex is normally greater than 11, much too high for many commercial applications. After addition of a poly (alkylenimine), upon adjustment of the pH of the latex to a pH of less than about 10, the latex normally gels.

It has been unexpectedly found that the thus formed enamine polymers may be stabilized against gelling due to the addition of poly(alkylenimine), by post polymerization addition of a surfactant. Preferably the surfactant is a nonionic surfactant having a hydrophilic-lipophilic (HLB) value of at least about 17.5. The surfactant may be added either prior to, with or after addition of the poly(alkylenimine), but before adjusting the pH of the polymer. The choice of surfactant for post polymerization addition to the emulsion polymer does not depend on the chemical structure of the surfactant, but only on the surfactant having an HLB value of at least about 17.5. In contrast to polymers that flocculate upon addition of a poly(alkylenimine), the addition of a poly (alkyleneimine), particularly poly(ethylenimine), to polymers to which surfactants having an HLB of at least about 17.5 has been added, does not cause flocculation, but provides a stable, waterborne polymer composition.

The addition of poly(ethylenimine) may be accomplished by adding, with stirring, poly(ethylenimine) to an emulsion of the acetoacetoxy polymer to which has also been added, a nonionic surfactant having an HLB value of at least about 17.5. Sufficient surfactant should be added to stabilize the enamine polymer. Typically, the surfactant may be added in an amount of from about 0.5 phr to about 5 phr based on dry polymer weight. Optionally, the surfactant may be added, with stirring, with the poly(ethylenimine) or after addition of the poly(ethylenimine); but prior to adjusting the pH of the polymer. Other surfactants and property modifying ingredients may also be added that do not impact on the stability of the waterborne composition.

The pH of the stable waterborne enamine polymer of the invention may then be adjusted by the addition of an acid or buffer. For example, buffers such as sodium bicarbonate, ammonium bicarbonate, ammonium dihydrogenphosphate, an ammonium polyacrylate, or a mixture of such buffers may be used. The buffer, such as ammonium bicarbonate, may generally be added to the stable, waterborne enamine polymer to adjust and/or buffer the pH of the composition to less than about 10. Waterborne enamine polymer compositions having pH values in the range of about 7.0 to about 9.8, preferably about 8.4 to about 9.2, may be achieved using ammonium buffers. Buffered compositions of the invention are particularly useful in coating formulations.

The stable enamine polymers of the present invention will vary in properties, depending on the end-use application. In general, the polymer composition may have a second cycle glass transition temperature (Tg) of −50 to +100° C.; more preferably, −35 to +50° C.

The weight average molecular weight of the stable enamine polymers may vary from about 20,000 to 5,000,000 daltons; more preferably from 100,000 to 2,000,000 and most preferably from 200,000 to 1,000,000. The molecular weight range may be controlled by reaction conditions, as is known in the art, or by the use of a chain transfer agent or crosslinkers, as discussed above.

A waterborne polymer composition of the invention may also contain other additives known in those compositions and may use other emulsion polymerization methodology. U.S. Pat. No. 5,371,148 provides a good description of possible additives and is incorporated herein by reference.

In a waterborne composition of the invention, the stable acetoacetoxy-functional, or enamine-functional polymers, may be present from about 5 to about 60 weight percent based on dry resin and more preferably from about 25 to about 55 weight percent. The examples below illustrate the preparation of polymers and water-based compositions according to the invention.

Latexes or other water-based compositions containing small particle size polymers, those ranging from about 25 to about 100 nm and more preferably from about 45 to about 85 nm, represent one preferred embodiment of the invention.

The stable polymers and waterborne polymer compositions of the invention are useful in a variety of coating formulations such as architectural coatings, metal coatings, wood coatings, plastic coatings, textile coatings, cementitious coatings, paper coatings, inks, and adhesive. Examples of such coating formulations adapted for particular uses include, but are not limited to, corrosion inhibitors, concrete coatings, maintenance coatings, latex paints, industrial coatings, automotive coatings, textile backcoatings, surface printing inks and laminating inks. Accordingly, the present invention relates to such coating formulations containing a waterborne polymer composition of the invention, preferably a water-based latex. The polymers and waterborne polymer compositions of the invention may be incorporated in those coating formulations in the same manner as known polymer latexes and used with the conventional components and or additives of such compositions. The coating formulations may be clear or pigmented. With their crosslinking ability, adhesion properties, and resistance properties, the water-based latexes of the invention impart new and/or improved properties to the various coating formulations.

Upon formulation, a coating formulation containing a stable polymer or waterborne polymer composition of the invention may then be applied to a variety of surfaces, substrates, or articles, e.g., paper, plastic, steel, aluminum, wood, gypsum board, concrete, brick, masonry, or galvanized sheeting (either primed or unprimed). The type of surface, substrate, or article to be coated generally determines the type of coating formulation used. The coating formulation may be applied using means known in the art. For example, a coating formulation may be applied by spraying or by coating a substrate. In general, the coating may be dried by heating but preferably is allowed to air dry. Advantageously, a coating employing a polymer of the invention may be thermally or ambiently cured. As a further aspect, the present invention relates to a shaped or formed article which has been coated with a coating formulations of the present invention.

A waterborne polymer composition according to the invention may comprise the stabilized polymer of the invention and water, along with a solvent, a pigment (organic or inorganic) and/or other additives and fillers known in the art, and enumerated below. When a solvent is used, water-miscible solvents are preferred. A latex paint composition of the invention may comprise a waterborne polymer composition of the invention, a pigment and one or more additives or fillers used in latex paints.

Additives or fillers used in formulating coatings include, but are not limited to, leveling, rheology, and flow control agents such as silicones, fluorocarbons, urethanes, or cellulosics; extenders; curing agents such as multifunctional isocyanates, multifunctional carbonates, multifunctional epoxides, or multifunctional acrylates; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; crosslinking agents; or coalescing agents. Specific examples of such additives can be found in *Raw Materials Index*, published by the National Paint & Coatings Association, 1500 Rhode Island Avenue, NW, Washington, D.C. 20005.

A polymer or waterborne polymer composition of the present invention can be utilized alone or in conjunction with other conventional waterborne polymers. Such polymers include, but are not limited to, water dispersible polymers such as consisting of polyesters, polyester-amides, cellulose esters, alkyds, polyurethanes, epoxy resins, polyamides, acrylics, vinyl polymers, polymers having pendant allyl groups such as described in U.S. Pat. No. 5,539,073, styrene-butadiene polymers, vinylacetate-ethylene copolymers, and the like.

The following examples are intended to illustrate, not limit, the invention:

EXAMPLES

Example 1

Latex Synthesis:

The reactor configuration was a 4 liter jacketed kettle held at 80° C. with circulating water. Deionized water was used and the atmosphere above the reaction was inerted with nitrogen. The reactor was charged with 1000 g water, 3 g of sodium bicarbonate and 54.5 g (1.5 phm) of Rhodacal A246L surfactant (a $C_{12,14}$ alpha olefin sodium sulfonate surfactant available from Rhone-Poulenc as a 38.5% solution in water), and heated to 80° C. An emulsion was made with 700 g of water, 10.9 g (0.3 phm) of Rhodacal A246L surfactant, 672 g of styrene, 476 g of butyl acrylate, 70 g of 2-hydroxyethyl methacrylate (HEMA), 140 g of acetoacetoxyethyl methacrylate (MEM) and 84 g of sodium 2-acrylamido-2-methylpropane sulfonate (AMPS 2405 monomer, available from Lubrizol Corporation as a 50% solution in water). To the reactor was added 110 g of the above emulsion, followed by a solution of 2.7 g of sodium persulfate in 20 g of water. After 5 minutes, the remainder of the emulsion was fed to the reactor over a 2 hour period. At the same time a solution of 1.5 g of sodium persulfate in 50 g of water was added to the reactor over a 1 hour period. The reaction mixture was held at 80° C. for 30 minutes after addition was complete, and the reactor was then cooled. As the reactor was cooled, a solution of 1.5 g of t-butylhydroperoxide in 30 g of water was added rapidly through the emulsion feed, and a solution of 1.5 g of sodium metabisulfite, 1.0 g of 50% sodium hydroxide solution and 80 g of water was added over 30 minutes. The pH of the latex was 6.90, particle size was 77 nm, and second cycle glass transistion temperature (Tg) of +38° C.

Addition of PEI:

A mixture of 336 g of a 40% solution of LUPASOL™ G-35 polyethylenimine (a 50% solids product of BASF) in water, 60 g of Tergitol 15-S-40 surfactant (70% active, $C_{11}$–$C_{15}$ secondary alcohol ethoxylate with an HLB of 18.0, a product of Union Carbide), and 84 g of water was added to the reactor over 30 minutes with a sub-surface feed. The pH of the latex was 11.2 and the particle size was 81 nm.

pH Adjustment

After 15 minutes, a solution of 5% ammonium carbonate and 15% ammonium bicarbonate in water was added (550 g) to achieve a pH of 9.84. The entire batch filtered rapidly through a 40 mm, 100 mesh stainless steel screen. The pH of the latex was 9.84, the particle size was 80 nm, and percent solids was 37.25%. This latex showed no significant thickening after 2 weeks at 60° C.

Example 2

Comparative Example 100 g of a latex similar to the one described in Example 1 was treated with the same proportion of PEI, but without post-addition of Tergitol 15-S-40, adjustment of the pH of the latex to 9.8 caused the mixture to gel within ten minutes.

Example 3

Evaluation of Various Nonionic Surfactants

A latex similar to the one described in Example 1 was prepared with a pH of 7.36, was 42.1% solids and a particle diameter of 74 nm. To 3270 g of this latex was added 330 g of a 40% solution of LUPASOL™ G-35 polyethylenimine (a 50% solids product of BASF) in water. The particle size as 80 nm.

This mixture was then blended with various nonionic surfactants at the rate of 3 g of surfactant (active basis) per 100 g of polymer (dry basis) and pH adjusted to 9.8 with a solution of 5% ammonium carbonate and 15% ammonium bicarbonate. The viscosity of the product was estimated by hand over time. The results with various nonionic surfactants is shown in Table 1. Mixtures containing nonionic surfactants having an HLB of at least about 17.5 were stable, while those with HLB of less than about 17.5 were unstable.

TABLE 1

Nonionic Surfactants

| Surfactant | Type | Class | HLB | RESULT UPON pH ADJUSTMENT to pH 9.8 |
|---|---|---|---|---|
| None (Ex. 2) | — | — | — | Gelled within 15 minutes |
| Igepal > CO210 | Nonylphenol ethoxylate | nonionic | 4.6 | Gelled immediately |
| Igepal CO520 | Nonylphenol ethoxylate | nonionic | 10 | Gelled immediately |
| Igepal CO630 | Nonylphenol ethoxylate | nonionic | 13 | Gelled 2 minutes |
| Triton ® CF-10 | alkylaryl polyether | nonionic | 14 | Gelled immediately |
| Igepal CO720 | Nonylphenol ethoxylate | nonionic | 14.2 | Gelled 15 minutes |
| Tergitol ® NP-40 | Nonylphenol ethoxylate | nonionic | 17.8 | Stable at 60° C. |
| Igepal CO 990 | Nonylphenol ethoxylate | nonionic | 19 | Stable at 60° C. |
| Igepal DM-970 | Dinonyl-phenoxypoly (ethyleneoxy) ethanol | nonionic | 19 | Stable at 60° C. |
| Tergitol 15-S-7 | secondary alcohol ethoxylate | nonionic | 12.1 | Gelled immediately |
| Surfonic ® LF-17 | alkyl polyoxyalkylene ether | nonionic | 12.2 | Gelled immediately |
| Tergitol 15-S-40 | secondary alcohol ethoxylate | nonionic | 18 | Stable at 60° C. |
| Span ® 80 | sorbitan monooleate | nonionic | 4.3 | Gelled 3 minutes |
| Span 20 | sorbitan monolaurate | nonionic | 8.6 | Gelled immediately |
| Tween ® 85 | PEO (20) sorbitan trioleate | nonionic | 11 | Gelled immediately |
| Tween 60 | PEO (20) sorbitan monostearate | nonionic | 14.9 | Gelled 20 minutes 60° oven |
| Tween 40 | PEO (20) sorbitan monopalmitate | nonionic | 15.6 | Gelled 20 minutes 60° oven |
| Tween 20 | PEO (20) sorbitan monolaurate | nonionic | 16.7 | Gelled 15 minutes 60° oven |
| Pluronic ® L-61 | EO-PO-EO Block copolymer, 10% EO | nonionic | 1–7 | Gelled immediately |
| Pluronic P-103 | EO-PO-EO Block copolymer, 30% EO | nonionic | 7–12 | Gelled immediately |
| Pluronic P-105 | EO-PO-EO Block copolymer 50% EO | nonionic | 12–18 | Gelled 15 minutes |
| Pluronic F-77 | EO-PO-EO Block copolymer 70% EO | nonionic | 24 | Stable at 60° |
| Pluronic F-87 | EO-PO-EO Block copolymer 70% EO | nonionic | 24 | Stable at 60° |

TABLE 1-continued

Nonionic Surfactants

| Surfactant | Type | Class | HLB | RESULT UPON pH ADJUSTMENT to pH 9.8 |
|---|---|---|---|---|
| Pluronic F-127 | EO-PO-EO Block copolymer 70% EO | nonionic | 18–23 | Stable at 60° |
| Pluronic F-68 | EO-PO-EO Block copolymer 80% EO | nonionic | 24 | Stable at 60° |
| Pluronic F-108 | EO-PO-EO Block copolymer 80% EO | nonionic | 24 | Stable at 60° |
| Polyethylene glycol | $M_n =$ 2000, 4600, 8000, 12000 | nonionic | | Gelled immediately |
| Poly(ethylene glycol-co-propylene glycol) | $M_n =$ 2500, 75% EO random copolymer | nonionic | | Gelled immediately |
| PO-EO-PO Block copolymer | $M_n =$ 2000, 50% EO or $M_n =$ 2700, 40% EO or $M_n =$ 3300, 10% EO | nonionic | — | Gelled immediately |
| Press-Wet OC2OA | Ethoxyethylated castor oil | nonionic | Unknown | Gelled immediately |
| Surfynol ® 104E | acetylenic diol | nonionic | 4 | Gelled immediately |
| Surfynol 440 | ethoxylated acetylenic diol | nonionic | 8 | Gelled immediately |
| Surfynol 485 | ethoxylated acetylenic diol | nonionic | 17 | Gelled 15 min 60° oven |

Example 4

Latex synthesis:

The experimental setup was the same as in Example 1. The reactor was charged with 1100 g water, 9.2 g of sodium bicarbonate and heated to 80° C. A monomer mixture was made with 18 g of Aerosol OT-75 surfactant (a 75% solution of sodium di(2-ethylhexyl)sulfosuccinate in water-alcohol, a product of the Cytec Chemical Co.), 748 g of 2-ethylhexyl acrylate, 100 g of styrene, 187 g of methyl methacrylate, 55 g of acetoacetoxyethyl methacrylate, 1.4 g of trimethylolpropane triacrylate. To the reactor was added 44 g of the monomer mixture, followed by a solution of 6.0 g of sodium persulfate in 35 g of water. After 15 minutes, the remainder of the monomer mixture was fed to the reactor over a 3 hour period. At the same time a solution of 3.4 g of sodium persulfate, 3 g of sodium dodecylbenzene sulfonate and 112 g of water was added to the reactor over the same 3 hour period. The reaction mixture was held at 80° C. for 30 minutes after addition was complete, and the reactor was then cooled. As the reactor was cooled, a solution of 1.5 g of t-butylhydroperoxide in 30 g of water was added rapidly through the monomer feed line, and a solution of 3 g of sodium metabisulfite and 80 g of water was added over 30 minutes. The latex product was 44.8% solids, 224 nm diameter in 0.01 M NaCl and Tg was −21°.

Addition of PEI and pH Adjustment:

To 150 g of the latex product was added 0.96 g of Tergitol 15-S-40 surfactant (70% active), followed by 8.4 g of a 40% solution of LUPASOL™ G-35 polyethylenimine (a 50% solids product of BASF) in water. After 30 min, the pH of the mixture was adjusted to 9.8 with ammonium bicarbonate, as described in Example 1. The mixture was free of coagulum and was stable at 60° C. for two weeks.

Example 5

Comparative Example

To 150 g of the latex product of Example 4 was added 8.4 g of a 40% solution of LUPASOL™ G-35 polyethylenimine (a 50% solids product of BASF) in water, but without the addition of Tergitol 15-S-40 surfactant. The mixture partly coagulated as soon as the PEI was added.

Example 6

Latex Polymer without Acetoacetoxy/Enamine Functionality Latex Synthesis

The reactor configuration was a 4 liter jacketed kettle held at 80° C. with circulating water. Deionized water was used and the atmosphere above the reaction was inerted with nitrogen. The reactor was charged with 800 g water, 60 g of of Maphos 60A surfactant (a 30% solution in water, neutralized to pH 8.6 with sodium hydroxide) and 3.5 g of acrylic acid. The pH of the contents of the reactor was adjusted to 8 with a 50% sodium hydroxide solution. An emulsion was made from 700 g water, 23.3 g of 30% Maphos 60A surfactant, 714 g styrene, 602 g butyl acrylate, 70 g of 2-hydroxyethyl methacrylate and 14 g of methacrylic acid. To the reactor was added a solution of 2 g of sodium persulfate in 20 g of water. After five minutes, the monomer emulsion was feed to the reactor over a two hour period. After 30 minutes, a solution of 1.5 g of sodium persulfate in 50 g water was added over 1 hour. One hour after the emulsion feed was started, 4.2 g of 2-ethylhexylmercapto propionate, a chain transfer agent, was added to the monomer emulsion. The reactor was held at 80° C. for 30 minutes after the addition was complete. As the reactor was cooled, a solution of 1.5 g of t-butylhydroperoxide in 30 g of water was added rapidly, and a solution of 1.5 g of sodium metabisulfite, 4.0 g of 50% sodium hydroxide solution and 50 g of water was added over 30 minutes. The pH of the latex was 6.5, the latex was 45.6% solids, particle size was 90 nm, and Tg +31° C.

Addition of PEI:

To 100 g of the latex was added 5.87 g of a 23.3% solution of Tergitol 15-S-40 surfactant (70% active), followed by 11.3 g of a 40% solution of LUPASOL™ G-35 polyethylenimine (a 50% solids product of BASF) in water. The mixture filtered readily through a 100 mesh stainless steel screen. The mixture did not gel and did not increase markedly in viscosity after one week at 60° C.

pH Adjustment:

The pH of the latex was not adjusted.

Example 7

Comparative Example 100 g of the latex of Example 7 was treated with the same proportion of PEI, but without post polymerization addition of Tergitol 15-S-40 surfactant. The pH of the latex was not adjusted. The addition of PEI without post polymerization addition of a surfactant caused the mixture to gel immediately.

Example 8

Use of Latex as a Laminating Ink Binder

To 65 parts of the latex of Example 1 was added 35 parts of an aqueous dispersion of a blue pigment, Flexisperse BFD 1121. The blue ink was applied to Mobil LBW 100 polypropylene film with a #3 RD wire wound rod using an RK coater. Adhesion was determined to be 4.5 on a 0 to 5 scale where 5 is best. Similarly, water resistance was 4.5, and dry rub was 4.5. The coated polypropylene was laminated to the polyethylene face of aluminized polyethylene, using a Sentinel Heat Sealer with a jaw pressure of 40 psi at 149° C. (300° F.) for 3 seconds. The average lamination strength of four replicates was 156 grams per cm (395 g/inch). A typical commercial laminating ink has a laminating strength of 40–100 g/cm.

Example 9

Use of Latex as Binder for Nonwoven Fiberglass

Latex Synthesis: (Polymerization Process incorporating a Nonionic Surfactant having HLB>17.5)

The reaction configuration was the same as in Example 1. The reactor was charged with 1350 g water and 7 g of sodium carbonate and heated to 80° C. A monomer mixture was made from 24.5 g of Aerosol OT-75 surfactant (75% sodium dioctylsulfosuccinate in water-alcohol), 1020 g of 2-ethylhexyl acrylate, 150 g of styrene, 255 g of methyl methacrylate and 75 g of acetoacetoxyethyl methacrylate, AAEM. A catalyst mixture was made from 3.5 g of sodium persulfate, 100 g of water and 22 g of Tergitol 15-S-40 surfactant (70% active). To the pot was added 47 g of the monomer mixture, followed by a solution of 6.0 g of sodium persulfate in 35 g of water. After 15 minutes, the remaining monomer and catalyst mixtures were fed to the reactor over 3 hours. The reaction mixture was held at 80° C. for 60 minutes after addition was complete, and the reactor cooled. As the reactor was cooled, a solution of 1.5 g of t-butylhydroperoxide in 30 g of water was added rapidly through the monomer feed line, and a solution of 1.5 g of sodium metabisulfite, 1.0 g of 50% sodium hydroxide solution and 80 g of water was added over 30 minutes. This chaser sequence was repeated a second time. The product had 46.5% solids, a pH of 6.9, 243 nm particle size with a polydispersity of 0.74, and a second cycle Tg of −25.2° C.

Addition of PEI:

A mixture of 32.6 g of a 40% solution of LUPASOL™ G-35 polyethylenimine (a 50% solids product of BASF) in water was added over 30 minutes to 700 g of the latex. After 16 hours, this material, which had a pH of 11.2, was adjusted to pH 9.8 with 40 g of 5% ammonium carbonate and 15% ammonium bicarbonate in water. The resulting latex remained stable.

Binder for Non-woven Fiberglass:

The composition of Example 9, both with and without PEI, was used to strengthen a non-woven fiberglass fabric. The fiberglass substrate was a product available from the CEM Corporation. Fiberglass mats were padded with the latex and air dried. Some samples were cured at 120° C. for one minute while others were not. All were equilibrated at 72° F. and 50% relative humidity for two days prior to measurement of tensile properties.

TABLE 2

| Description | Heat History | Application rate | Tensile Strength |
| --- | --- | --- | --- |
| Untreated | unheated | 0 | 170 psi |
| Neat Latex | unheated | 38.8 g/m² | 756 psi |
| Neat Latex | 120° C./1 min. | 50.1 g/m² | 380 psi |
| Latex with 5% PEI | unheated | 36.9 g/m² | 922 psi |
| Latex with 5% PEI | 120° C./1 min. | 41.8 g/m² | 588 psi |

Example 10

Use of Latex as an Architectural Coatings

Latex Synthesis:

The reaction configuration was the same as in Example 1. The reactor was charged with 1100 g water, 5.8 g sodium carbonate and 32 g of a 1% solution of Aerosol OT-75 surfactant and heated to 80° C. A monomer mixture was made from 264 g styrene, 583 g of 2-ethylhexyl acrylate, 143 g of methyl methacrylate and 110 g acetoacetoxyethyl methacrylate. To the reactor was added 47 g of the monomer mixture, followed by addition of a solution of 6.0 g of sodium persulfate in 35 g of water. After 15 minutes, the remaining monomer was fed to the reactor over a 2 hour period. At the same time a solution of 3.4 g of sodium persulfate and 15 g of a 20% solution of sodium dodecylbenzene sulfonate in 100 g of water was added over a 3 hour period. The reaction mixture was held at 80° C. for 30 minutes after the addition was complete, and the reactor was cooled. As the reactor was cooled, a solution of 1.5 g of t-butylhydroperoxide in 30 g of water was added rapidly through the monomer feed line, and a solution of 1.5 g of sodium metabisulfite, 1.0 g of 50% sodium hydroxide solution and 80 g of water was added over 30 minutes. A second charge of t-butylhydroperoxide was made, followed by 1.5 g of sodium metabisulfite in 80 g of water. The entire batch filtered readily through a 40 mm diameter 100 mesh screen and the amount retained on the mesh was 6 ppm, dry basis. The latex had a pH of 7.1, 42.2% solids, Tg of −2° C. and particle diameter in 0.01 M NaCl was 190 nm.

To 800 g of this latex was added 43.5 g of a 23.3% solution of Tergitol 15-S-40 surfactant (3 parts surfactant per 100 parts latex polymer on a dry basis). A viscosity modifier, 1.5 g of DSX-1514 associative thickener, available from Henkel Corporation, was added to give a Brookfield viscosity of 200 cps, and Tg of −2°. To portions of this latex mixture was added a 40% solution of LUPASOL™ G-35 polyethylenimine (a 50% solids product of BASF) to give 2, 4, 6, 8 and 10 parts of PEI per 100 parts of latex polymer on a dry basis. After one hour, these mixtures were adjusted to pH 9.8 with a solution of 5% ammonium carbonate and 15% ammonium bicarbonate. These liquids were applied as 20 mil (0.5 mm) wet films on release paper. After three days curing at 22° C./50% relative humidity, the tensile strength of the samples was measured. The values reported below are the average of ten measurements.

The samples with no PEI were weak and difficult to handle and only 4 measurements were done. The results are shown in Table 3. The tensile strength did not increase significantly after curing at room temperature for ten days, nor upon oven heating at 120° for one minute.

TABLE 3

Tensile Strength of the Latex at Different PEI Levels.

| PEI Content* | Tensile Strength, kg/cm² (psi) | Elongation at Break |
|---|---|---|
| 0 | 1.8 (26) | 761% |
| 2 | 68 (967) | 139% |
| 4 | 64 (913) | 138% |
| 6 | 60 (853) | 148% |
| 8 | 14 (199) | 66% |
| 10 | 12 (167) | 75% |

*parts PEI per 100 parts latex polymer on a dry basis

Example 11

Use of Latex in a Laminating Ink Formulation

Latex Synthesis

The reactor configuration was a 4 liter jacketed kettle held at 80° C. with circulating water. Deionized water was used and the atmosphere above the reaction was inerted with nitrogen. The reactor was charged with 1000 g of water, 3 g of sodium bicarbonate and 54.5 g (1.5 phm) of Rhodacal A246L surfactant and heated to 80° C. An emulsion was made from 700 g of water, 10.9 of Rhodacal A246L surfactant, 686 g of styrene, 518 g of butyl acrylate, 70 g of 2-hydroxyethyl methacrylate and 84 g of AMPS 2405 monomer (a 50% solution in water available from Lubrizol Corporation). To the reactor was added 110 g of the emulsion, followed by a solution of 2.7 g of sodium persulfate dissolved in 20 g of water. After 5 minutes, the remainder of the emulsion was fed to the reactor over a 2 hour period. Thirty minutes after the emulsion feed was started, 84 g of acetoacetoxyethyl methacrylate was pumped into the emulsion at 1.4 grams per minute. When the emulsion feed was started, a solution of 1.5 g of sodium persulfate in 50 g of water was added to the reactor over one hour. The reaction mixture was held at 80° C. for 30 minutes after addition was complete, and the reactor was then cooled. As the reactor was cooled, a solution of 1.5 g of t-butylhydroperoxide in 30 g of water was added rapidly, and a solution of 1.5 g of sodium metabisulfte, 1.0 g of 50% sodium hydroxide solution and 80 g of water was added over 30 minutes. The latex was 42.15% solids and had a particle diameter of 75 nm by light scattering.

Addition of PEI and pH Adjustment:

To 700 g of the latex was added 88.5 g of a 40% solution of LUPASOL™ G-35 polyethylenimine (a 50% solids product of BASF) in water and 12.6 g of Tergitol 15-S-40 surfactant (70% active). The mixture was rolled overnight and filtered readily, with little residue, through a 100 mesh stainless steel screen. To this mixture was added 120 g of 5% ammonium carbonate and 15% ammonium bicarbonate in water, resulting in a latex having a pH of 9.8. This material filtered readily through a mesh screen and did not increase markedly in viscosity after two weeks at 60° C.

Ink Example 1

A weight of 65.0 g of the latex of Example 11 was placed in a wide-mouthed jar. To the jar was added 35.0 g of Flexiverse Blue BHD-1121 pigment dispersion (a commercial C.I. Blue 15:3 colorant from Sun Chemical Corporation, Dispersions Division, Amelia, Ohio). The latex and ink were mixed with a laboratory stirrer for 10 minutes, then 1 hour on a roller, and allowed to stand until the foam dissipated.

Ink Examples 2 through 7

Six blends of the latex example 11 and a 40% solution of LUPASOL™ G-35 polyethylenimine (a 50% solids product of BASF) were prepared by the procedure described in Example 13, including pH adjustment. The blends contained 4, 8, 12, 16, 20 and 24 phr of PEI, respectively. The term "phr" is defined as parts of polyethylenimine solids per hundred parts of latex solids). A weight of 65.0 g of the thus prepared latex and PEI blends was placed in a wide-mouthed jar. To each jar was added 35.0 g of Flexiverse Blue BHD-1121 pigment dispersion. The mixtures were mixed with a laboratory stirrer for 10 minutes, then 1 hour on a roller, and then allowed to stand until the foam dissipated.

Ink Application and Test Methods:

The inks were applied and tested according to the following procedures. The inks were applied to Mobil 100 LBW oriented polypropylene (OPP) available from Mobil Corporation, which was corona-treated prior to use about 6 months prior to use, with a #3 RD rod using a K-Coat Automatic Coating Machine operated at a speed of 2.5. The prints were dried 5 inches from the blower face, 8 to 11.5 inches from the floor and 2 to 13 inches from the back wall of a VWR-1350 FD forced air oven. The prints were dried on a wooden frame which allowed accurate placement, and were dried perpendicular to the air flow. Drier time was 3 seconds from door closing to door opening. Dried temperature was 100° C. (+/−1° C.). Properties of interest for surface printing (wet rub, water spot, dry spot, and adhesion) were tested 5 minutes after drying.

Surface Property Testing

Water Resistance: A drop of distilled water was placed on the dried ink film. The drop was allowed to stay for 5 minutes, then absorbed into a dry Shurwipe paper wrapped around the middle and index fingers. With moderate pressure, the wetted towel was rubbed diagonally back and forth across the soaked area for 20 cycles. For both the soaked area (spot) and the perimeter of the spot, a rating of 0 to 5 was given, where 5 is no ink removal and 0 is complete ink removal.

Dry Rub: A dry Shurwipe paper towel wrapped around the middle and index fingers was rubbed with the moderate pressure diagonally back and forth across the dried film for 20 cycles. A rating between 0 and 5 was given, where 5 is no ink removal and 0 is complete ink removal.

Tape Adhesion: One end of a piece of Scotch brand Tape, Type 600, was applied to the surface of the dried ink film. It was firmly rubbed to remove air bubbles and insure good contact with the ink. The tape was pulled quickly at about a 45° angle. A rating between 0 and 5 was given, where 5 is no ink removal and 0 is complete ink removal.

Lamination Strength Testing:

The prints were aged overnight before laminating and aged again overnight before testing the lamination strength. Both the top and bottom jaws of a Sentinel Heat Sealer were pre-heated 300° C. The jaw pressure was set to 40 psi. The laminating substrate, a metallized film coated with a polyethylene blend, was cut to just completely cover the printed substrate.

The two were placed with the polyethylene coating facing the ink, then the film "sandwich" was put into a folded piece of paper. Using a marked section of the bars as a positioning guide, the paper was pushed all the way to the back of the heat sealer, and then withdrawn about one eighth of an inch. The substrates were laminated at 300° C. for 3 seconds. The laminated sample was removed from the heat sealer, and was quickly covered with an aluminum plate for a few seconds to dissipate the heat. The laminates were tested 24 hours after laminating with an Instron Tensile tester, Model TM (Drive BX, Low BY=2) using a 5 pound cell. Strength was averaged for the first 3 inches of the recording chart where

TABLE 4

Surface Printing and Lamination Ink Properties

| Ink Example | PEI (phr) | Lamination Bond Strength (g/in) | Tape Adhesion | Water Spot | Water Perimeter | Dry Rub |
| --- | --- | --- | --- | --- | --- | --- |
| 1 | 0 | 50 | 5 | 4 | 5 | 2 |
| 2 | 4 | 250 | 4 | 4 | 5 | 2 |
| 3 | 8 | 320 | 4 | 5 | 5 | 4 |
| 4 | 12 | Tearbond | 4 | 4 | 4 | 4 |
| 5 | 16 | Tearbond | 4 | 0 | 0 | 4 |
| 6 | 20 | Tearbond | 4 | 0 | 0 | 3 |
| 7 | 24 | Tearbond | 4 | 0 | 0 | 2 |

What is claimed is:

1. A stable waterborne polymer composition comprising an acetoacetoxy-type functional polymer; a poly(alkylenimine); and a nonionic surfactant having a hydrophilic-lipophilic balance (HLB) of at least about 17.5.

2. The stable waterborne polymer composition of claim 1 wherein said acetoacetoxy-type functional polymer comprises the reaction product of about 0.5 to about 30 weight percent of vinyl monomers having acetoacetoxy-type functionality and about 99.5 to about 70 weight percent of other vinyl monomers.

3. The stable waterborne polymer composition of claim 2 wherein said vinyl monomers having acetoacetoxy-type functionality is a vinyl monomer having an acetoacetoxy-type functionality of Formula (I):

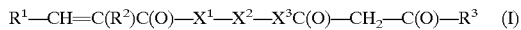

$R^1$—CH=C($R^2$)C(O)—$X^1$—$X^2$—$X^3$C(O)—CH$_2$—C(O)—$R^3$  (I)

where $R^1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S, or a group of the formula —N(R')—, in which R' is a $C_1$–$C_6$ alkyl group; $X^2$ is a $C_1$–$C_{12}$ alkylene group or $C_3$–$C_{12}$ cycloalkylene group.

4. The stable waterborne polymer composition of claim 3 wherein said vinyl monomer having acetoacetoxy-type functionality is selected from the group consisting of acetoacetoxy-ethyl methacrylate, acetoacetoxyethyl acrylate, acetoacetoxy(methyl)ethyl acrylate, cetoacetoxypropyl acrylate, allyl acetoacetate, acetoacetamidoethyl meth)acrylate, and acetoacetoxybutyl acrylate.

5. The stable waterborne polymer composition of claim 2 wherein said polymer further comprises up to about 2 weight percent of a chain transfer agent selected from the group consisting of butyl mercaptan, mercaptopropionic acid, 2-ethylhexyl mercaptopropionate, dodecyl mercaptan, n-butyl mercaptopropionate, octyl mercaptan, isodecyl mercaptan, octadecyl mercaptan, mercaptoacetic acid, allyl mercaptopropionate, allyl mercaptoacetate, crotyl mercaptopropionate, and crotyl mercaptoacetate; and up to about 2 weight percent of a crosslinking agent selected from the group consisting of trimethylol-propane tri(meth) acrylate, 1,6-hexanediol di(meth)acrylate, and allyl methacrylate.

6. The stable waterborne polymer composition of claim 1 wherein said poly(alkylenimine) is present in an amount from about 0.5 to about 25 weight percent based on the dry weight of the polymer.

7. The stable waterborne polymer composition of claim 1 wherein said poly(alkylenimine) is polyethylenimine.

8. The stable waterborne polymer composition of claim 1 wherein said surfactant having a hydrophilic-lipophilic balance (HLB) of at least about 17.5 is selected from the group consisting of alkyl polyglycol ethers; alkyl phenol polyglycol ethers; and EO-PO-EO block copolymers.

9. A coating formulation selected from an architectural coating, a metal coating, a wood coating, a plastic coating, a textile coating, a cementitious coating, a paper coating, an ink, and an adhesive, comprising the stable waterborne polymer composition of claim 1 and at least one additive selected from a solvent, a pigment, a buffer, a leveling agent, a rheology agent, a curing agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a drying agent, a catalyst, a crosslinking agent, and a coalescing agent.

10. A stable waterborne polymer composition comprising an acetoacetoxy-type functional polymer and a poly(alkylenimine), wherein said acetoacetoxy-type functional polymer is polymerized in the presence of a nonionic surfactant having a hydrophilic-lipophilic balance (HLB) of at least about 17.5.

11. A coating formulation selected from an architectural coating, a metal coating, a wood coating, a plastic coating, a textile coating, a cementitious coating, a paper coating, an ink, and an adhesive, comprising the stable waterborne polymer composition of claim 10 and at least one additive selected from a solvent, a pigment, a buffer, a leveling agent, a rheology agent, a curing agent, a flow control agent, an extender, a reactive coalescing aid, a flatting agent, a pigment wetting agent, a dispersing agent, a surfactant, an ultraviolet (UV) absorber, a UV light stabilizer, a defoaming agent, an antifoaming agent, an anti-settling agent, an anti-sag agent, a bodying agent, an anti-skinning agent, an anti-flooding agent, an anti-floating agent, a fungicide, a mildewcide, a corrosion inhibitor, a thickening agent, a plasticizer, a reactive plasticizer, a drying agent, a catalyst, a crosslinking agent, and a coalescing.

12. A method of making a stable waterborne polymer composition comprising polymerizing a vinyl monomer having an acetoacetoxy functionality with other vinyl monomers to form an acetoacetoxy-type functional polymer; adding a poly(alkylenimine) and a nonionic surfactant having a hydrophilic-lipophilic balance (HLB) of at least about 17.5 to said acetoacetoxy-type functional polymer polymer; and adjusting the pH of the waterborne polymer composition to less than about 10.

13. The method of claim 12 wherein said polymer comprises the reaction product of about 0.5 to about 30 weight percent of vinyl monomers having acetoacetoxy-type functionality and about 99.5 to about 70 weight percent of other vinyl monomers; said poly(alkylenimine) is polyethylenimine present in an amount from about 0.5 to about 25 weight percent based on the dry weight of the polymer; and the pH is adjusted to a range of from about 7.0 to about 9.8.

14. The method of claim 13 wherein said vinyl monomers having acetoacetoxy-type functionality is a vinyl monomer having an acetoacetoxy-type functionality of Formula (I):

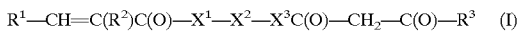

$R^1$—CH=C($R^2$)C(O)—$X^1$—$X^2$—$X^3$C(O)—CH$_2$—C(O)—$R^3$  (I)

where $R^1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S, or a group of the formula —N(R')—, in which R' is a $C_1$–$C_6$ alkyl group; $X^2$ is a $C_1$–$C_{12}$ alkylene group or $C_3$–$C_{12}$ cycloalkylene group.

15. The method of claim 12 wherein said vinyl monomer having acetoacetoxy-type functionality is selected from the group consisting of acetoacetoxy-ethyl methacrylate, acetoacetoxyethyl acrylate, acetoacetoxy(methyl)ethyl acrylate, acetoacetoxypropyl acrylate, allyl acetoacetate, acetoacetamidoethyl (meth)acrylate, and acetoacetoxybutyl acrylate.

16. The method of claim 12 wherein said polymerizing further occurs in the presence of up to about 2 weight percent of a chain transfer agent selected from the group consisting of butyl mercaptan, mercaptopropionic acid, 2-ethylhexyl mercaptopropionate, dodecylmercaptan, n-butyl mercapto-propionate, octyl mercaptan, isodecyl mercaptan, octadecyl mercaptan, mercaptoacetic acid, allyl mercaptopropionate, allyl mercaptoacetate, crotyl mercaptopropionate, and rotyl mercaptoacetate; and up to about 2 weight percent of a crosslinking gent selected from the group consisting of trimethylol-propane ri(meth) acrylate, 1,6-hexanediol di(meth)acrylate, and allyl methacrylate.

17. The method of claim 12 wherein said poly (alkylenimine) is poly(ethyleneimine).

18. The method of claim 12 wherein said surfactant having a hydrophilic-lipophilic balance (HLB) of at least about 17.5 is selected from the group consisting of alkyl polyglycol ethers; alkyl phenol polyglycol ethers; and EO-PO-EO block copolymers.

19. A method of stabilizing a waterborne acetoacetoxy-type functional latex polymer to which a poly(alkylenimine) is added comprising the step of adding a nonionic surfactant having a hydrophilic-lipophilic balance (HLB) of at least about 17.5 prior to, with or after addition of said poly (alkylenimine).

20. The method of claim 19 wherein said poly (alkylenimine) is poly(ethylenimine) and is present in an amount from about 0.5 to about 25 weight percent based on the dry weight of the polymer.

* * * * *

UNITED STATES PATENT AND TRADEMARK OFFICE
CERTIFICATE OF CORRECTION

PATENT NO.   : 6,005,035                                               Page 1 of 1
DATED        : December 31, 1999
INVENTOR(S)  : Peter Webb Raynolds, Duane Allan Scott It is certified that error appears in the above-identified patent and that said Letters Patent is hereby corrected as shown below:

Correction(s):

Column 17,
Line 34: $R^1\text{-CH=C}(R^2)C(O)\text{-}X^1\text{-}X^2\text{-}X^3\text{=C}(O)\text{-CH}_2\text{-C}(O)\text{-}R^3$
Line 46: acetoacetox-
Line 47: (meth)acrylate Column 18,
Line 50: [polymer] polymer;

Column 19,
Line 18: crotyl
Line 19: agent
Line 20: tri(meth)

Signed and Sealed this

Nineteenth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.  : 6,005,035                                      Page 1 of 1
DATED       : 'December 21, 1999
INVENTOR(S) : Raynolds et al.

It is certified that error appears in the above-identified patent and that said Letters Patent is hereby corrected as shown below:

<u>Title page,</u>
Item [60], should be added to the patent cover sheet indicating the Related U.S. Application Data,
-- Provisional application No. 60/059,506, filed Sept. 18, 1997. --

Signed and Sealed this

Twenty-sixth Day of February, 2002

Attest:

*Attesting Officer*

JAMES E. ROGAN
*Director of the United States Patent and Trademark Office*